United States Patent
Whyman et al.

(10) Patent No.: US 12,160,072 B2
(45) Date of Patent: *Dec. 3, 2024

(54) POWER DELIVERY ASSEMBLY AND COMPONENTS THEREOF

(71) Applicant: Leisure Time Products, LLC, Pittsburg, KS (US)

(72) Inventors: Daniel R. Whyman, Lamar, MO (US); Randall L. Day, Lamar, MO (US)

(73) Assignee: Leisure Time Products, LLC, Pittsburg, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,763

(22) Filed: May 9, 2024

(65) Prior Publication Data

US 2024/0291216 A1    Aug. 29, 2024

Related U.S. Application Data

(63) Continuation of application No. 18/485,984, filed on Oct. 12, 2023, now Pat. No. 12,015,227, which is a continuation of application No. 18/218,632, filed on Jul. 6, 2023, now Pat. No. 11,791,596, which is a continuation of application No. 17/458,204, filed on Aug. 26, 2021, now Pat. No. 11,710,934.

(60) Provisional application No. 63/070,970, filed on Aug. 27, 2020.

(51) Int. Cl.
| | | |
|---|---|---|
| *H01R 13/447* | (2006.01) | |
| *H01R 25/00* | (2006.01) | |
| *H01R 13/70* | (2006.01) | |

(52) U.S. Cl.
CPC ........ *H01R 25/006* (2013.01); *H01R 13/447* (2013.01); *H01R 13/70* (2013.01)

(58) Field of Classification Search
None
See application file for complete search history.

(56) References Cited

U.S. PATENT DOCUMENTS

| | | | | |
|---|---|---|---|---|
| 4,303,296 A * | 12/1981 | Spaulding | .............. | H04Q 1/142 439/189 |
| 4,546,418 A * | 10/1985 | Baggio | .................... | H02B 1/50 362/85 |
| 5,394,466 A * | 2/1995 | Schneider | .............. | H04N 7/104 379/413.03 |
| 5,486,664 A * | 1/1996 | Lamp | ..................... | H02G 3/185 439/942 |
| 6,227,890 B1 * | 5/2001 | Roper, Jr. | .......... | H01R 13/6397 361/641 |
| 6,492,590 B1 * | 12/2002 | Cheng | ................ | H01R 13/6658 52/27 |

(Continued)

*Primary Examiner* — Tho D Ta
(74) *Attorney, Agent, or Firm* — FROST BROWN TODD LLP

(57) ABSTRACT

An assembly for supporting a power strip is provided and includes a housing. The housing extends between an upper end and a lower end. The housing includes front and rear enclosures. The front enclosure includes a front wall and an interior wall. The front wall defines a front aperture. The interior wall extends from the front wall and at least partially defines an interior receptacle that is configured to receive a body of a power strip. The interior wall and the rear enclosure cooperate to enclose a body of a power strip within the interior receptacle.

20 Claims, 6 Drawing Sheets

(56) References Cited

U.S. PATENT DOCUMENTS

| | | | |
|---|---|---|---|
| 7,110,653 B2 * | 9/2006 | Sobel | G02B 6/4256 |
| | | | 439/142 |
| 8,023,271 B2 * | 9/2011 | Arlotta | H02G 3/088 |
| | | | 361/752 |
| 8,946,548 B2 * | 2/2015 | Sanders | H02G 3/088 |
| | | | 361/604 |
| 10,283,949 B2 * | 5/2019 | Thomas | H02G 3/088 |
| 12,015,227 B2 * | 6/2024 | Whyman | H01R 25/006 |
| 2021/0107368 A1 * | 4/2021 | Helnerus | B60L 53/11 |

* cited by examiner

POWER DELIVERY ASSEMBLY AND COMPONENTS THEREOF

REFERENCE TO RELATED APPLICATION

This application is a continuation of U.S. patent application Ser. No. 18/485,984, filed Oct. 12, 2023, entitled Power Delivery Assembly and Components Thereof which is a continuation of U.S. patent application Ser. No. 18/218,632, filed Jul. 6, 2023, entitled Power Delivery Assembly and Components Thereof which is a continuation of U.S. patent application Ser. No. 17/458,204, filed Aug. 26, 2021, entitled Power Delivery Assembly and Components Thereof which claims priority of U.S. provisional patent application Ser. No. 63/070,970, entitled Power Delivery Assembly and Housing for Same, filed Aug. 27, 2020, and hereby incorporates these applications by reference herein in their respective entireties.

TECHNICAL FIELD

A power delivery assembly for a pergola or other building is provided. The power delivery assembly includes a housing and a power strip.

BACKGROUND

Conventional outdoor buildings are oftentimes delivered to a site without accommodations for plugging in electronic devices.

BRIEF DESCRIPTION OF THE DRAWINGS

It is believed that certain embodiments will be better understood from the following description taken in conjunction with the accompanying drawings in which.

DETAILED DESCRIPTION

Figure 1:
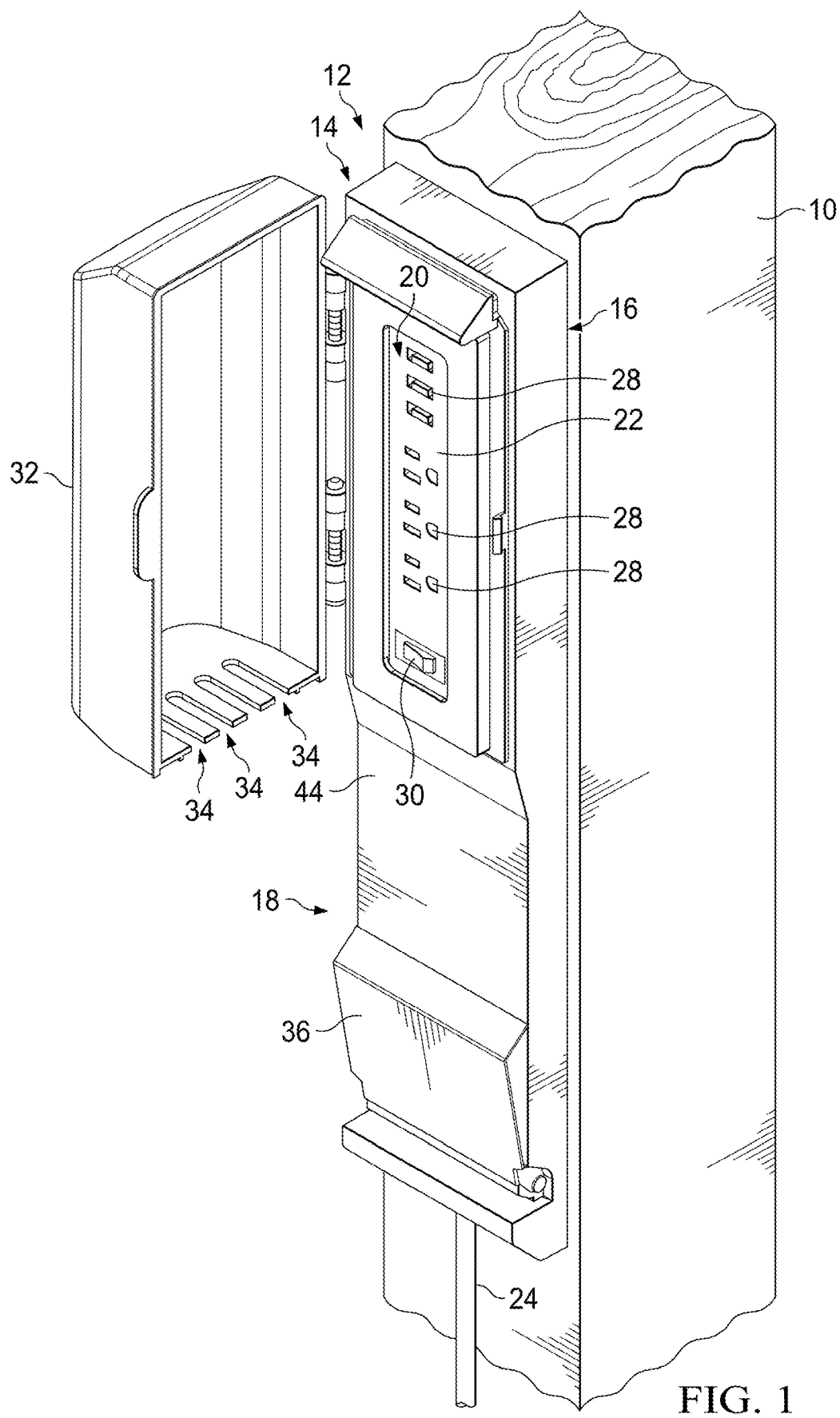
FIG. 1 is a right isometric view depicting a vertical post of a pergola and a power delivery assembly coupled with the vertical post, the power delivery assembly having a cover shown in an opened position and a shelf shown in a stored position.
Figure 2:
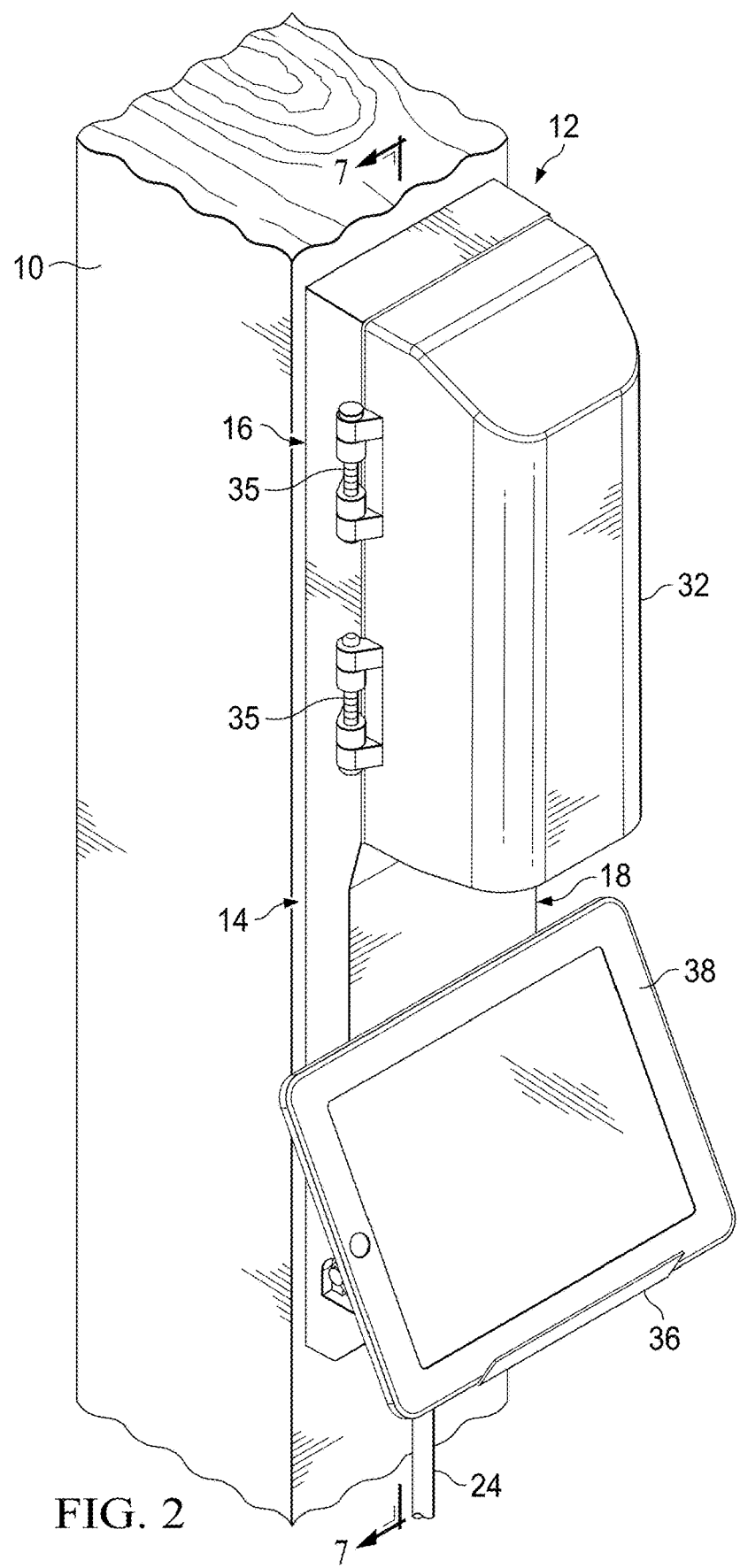
FIG. 2 is a left isometric view depicting the power delivery assembly of FIG. 1, but with the cover shown in a closed position and the shelf shown in a deployed position.

In connection with the views and examples of FIGS. 1-7, wherein like numbers indicate the same or corresponding elements throughout the views, FIGS. 1 and 2 illustrate a vertical post 10 that is part of a pergola. A power delivery assembly 12 can be coupled with the vertical post 10 and configured to facilitate powering of a corded electrical device, such as a charger for a mobile device (e.g., mobile phone or tablet), a string of lights, or an extension cord. It is to be appreciated that although a pergola (e.g., 10) is described herein, the power delivery assembly 12 can be used on any of a variety of suitable alternative buildings, such as a gazebo, an arbour, a shed, a pavilion, a pole barn, a house, or a high-rise building, for example.

Still referring to FIGS. 1 and 2, the power delivery assembly 12 can include a housing 14 that extends between an upper end 16 and a lower end 18. As illustrated in FIG. 1, a power strip 20 can be supported by the housing 14 and can include a body 22 and a cord 24. The body 22 can include a plurality of electrical sockets 28 that are each configured to interface with an electrical cord (not shown). The cord 24 can include a plug (not shown) (e.g., a male plug) that can allow for the power strip 20 to be plugged into a power source, such as an energized extension cord, to transmit electrical power to the electrical sockets 28. The body 22 can also include a switch 30 that is operable to selectively energize the electrical sockets 28.

A cover 32 can be disposed at the upper end 16 of the housing 14 and pivotally coupled thereto such that the cover 32 is pivotable between an opened position (FIG. 1) and a closed position (FIG. 2). When the cover 32 is in the closed position, it can overlie the body 22 of the power strip 20 to protect the body 22 from being exposed to environmental conditions, such as precipitation or airborne particulates, which could adversely affect the operation of the power strip 20. The cover 32 can define a plurality of slots 34 (FIG. 1) that can allow for routing of any electrical cords (not shown) to the electrical sockets 28 when the cover 32 is in the closed position. In one embodiment, the cover 32 can be biased into the closed position by a pair of springs 35 (FIG. 2).

A shelf 36 can be disposed at the lower end 18 of the housing 14 and pivotally coupled thereto such that the shelf 36 is pivotal between a stored position (FIG. 1) and a deployed position (FIG. 2). As illustrated in FIG. 2, when the shelf 36 is in the deployed position, an electronic device 38 can be provided on the shelf 36 beneath the body 22 of the power strip 20 and plugged into the electrical sockets 28 to facilitate charging of the electronic device 38. The electronic device 38 can be a tablet (as illustrated in FIG. 2), a mobile phone, a laptop, a smart watch, a portable speaker, headphones, earbuds, or any of a variety of suitable alternative rechargeable electronic devices. When the electronic device 38 is removed from the shelf 36 (e.g., when charging is complete and/or when a user wants to use the electronic device 38), the shelf 36 can be pivoted into the stored position to prevent the shelf 36 from being inadvertently contacted (e.g., by a passerby). In one embodiment, the housing 14 and the shelf 36 can be formed of a thermoplastic material and the cover 32 can be formed of a polycarbonate material. It is to be appreciated, however, that any of a variety of suitable alternative materials (or combinations thereof) are contemplated for the housing 14, the cover 32, and/or the shelf 36, such as, for example, a metal material (e.g., stainless steel).

Figure 3:
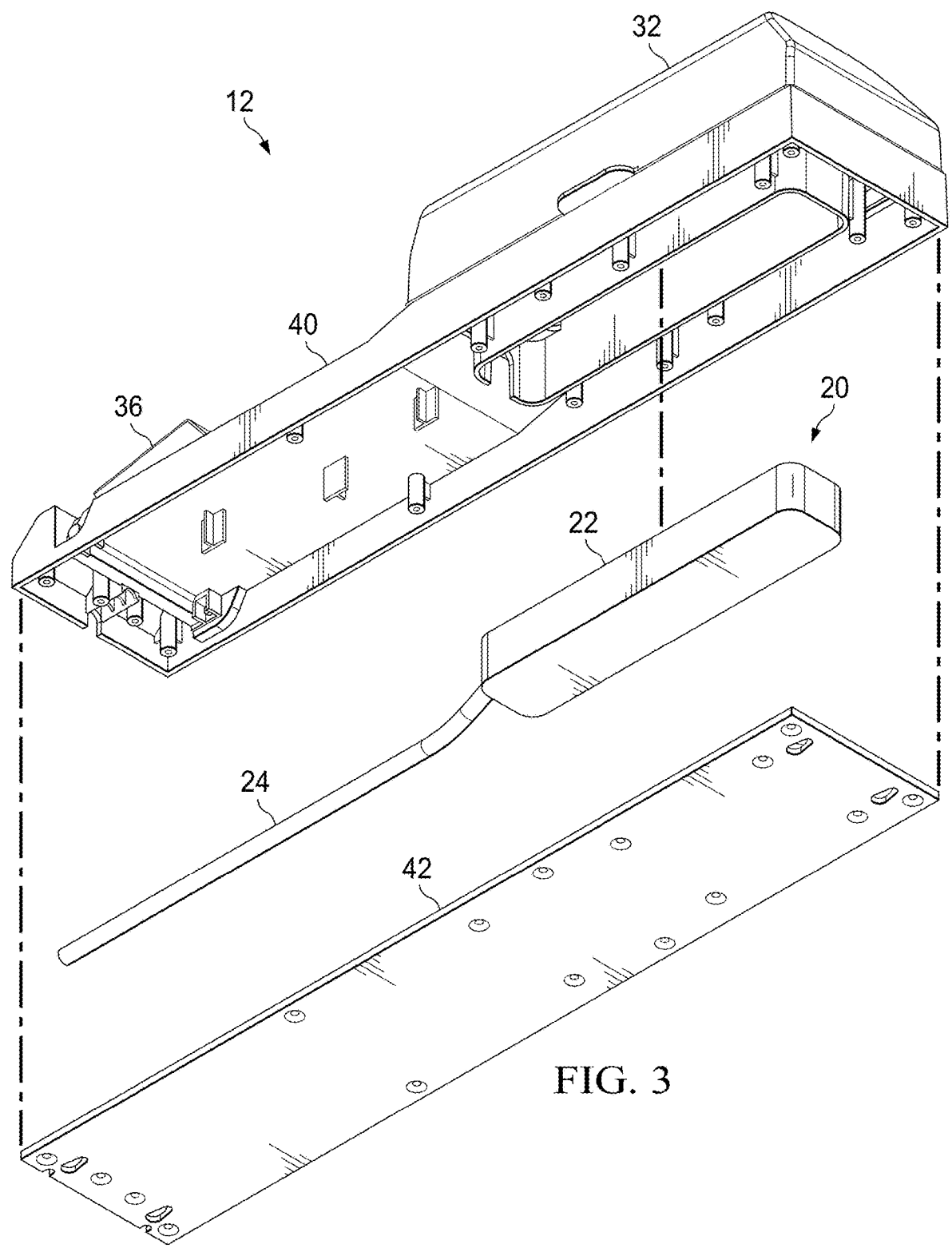
FIG. 3 is a partially exploded view of the power delivery assembly of FIG. 1.

Referring now to FIG. 3, the housing 14 can include a front enclosure 40 and a rear enclosure 42. The body 22 of the power strip 20 and a portion of the cord 24 can be interposed between the front enclosure 40 and the rear enclosure 42. In one embodiment, the rear enclosure 42 can be coupled to the front enclosure 40 with fasteners (not shown). It is to be appreciated that the rear enclosure 42 can additionally or alternatively be coupled to the front enclosure 40 with any of a variety of suitable alternative attachment arrangements, such as, for example, adhesive, via an interference fit, or via welding.

Figure 4:
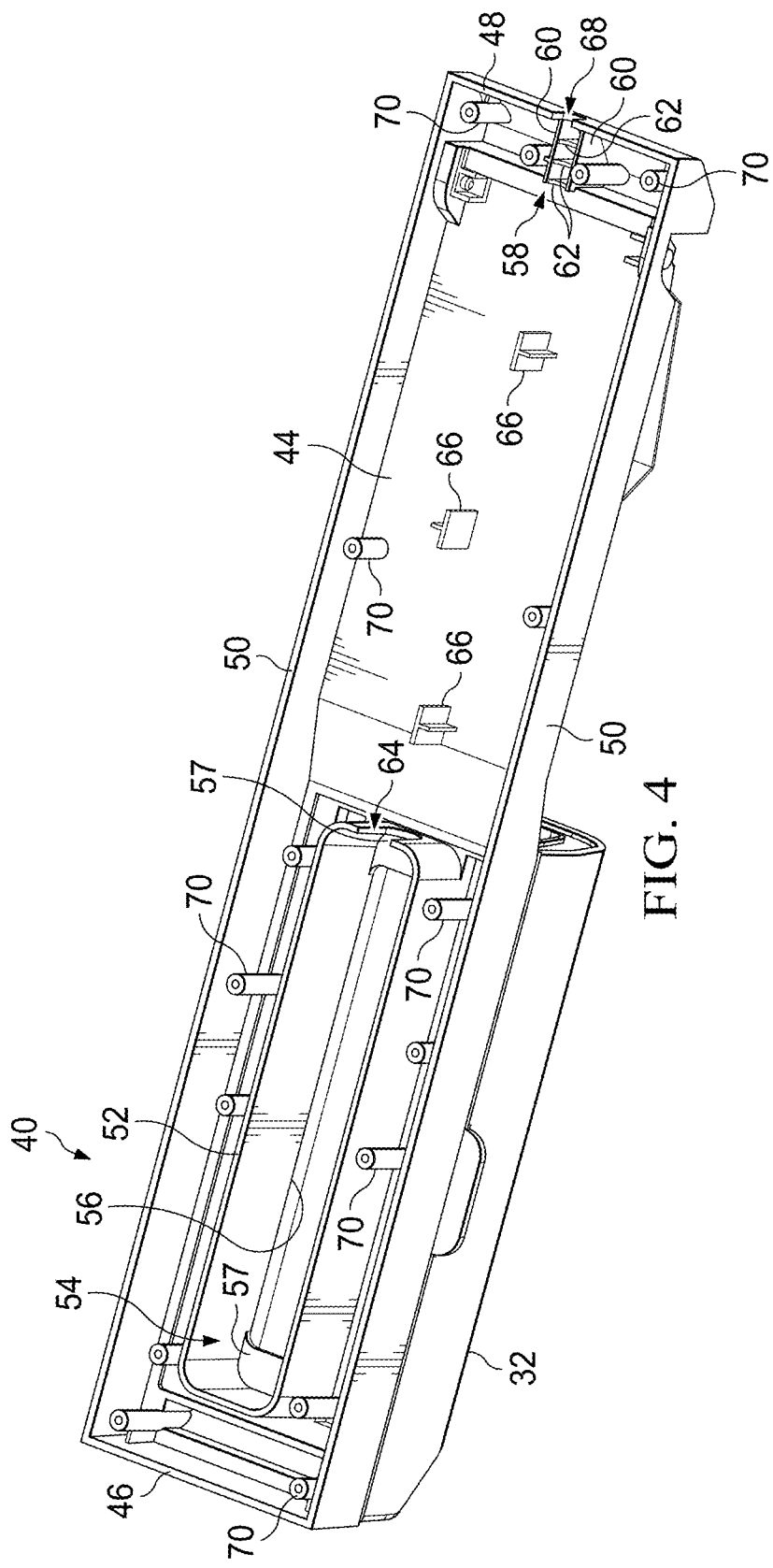
FIG. 4 is a rear isometric view depicting a front enclosure of the power delivery assembly of FIG. 1.
Figure 5:
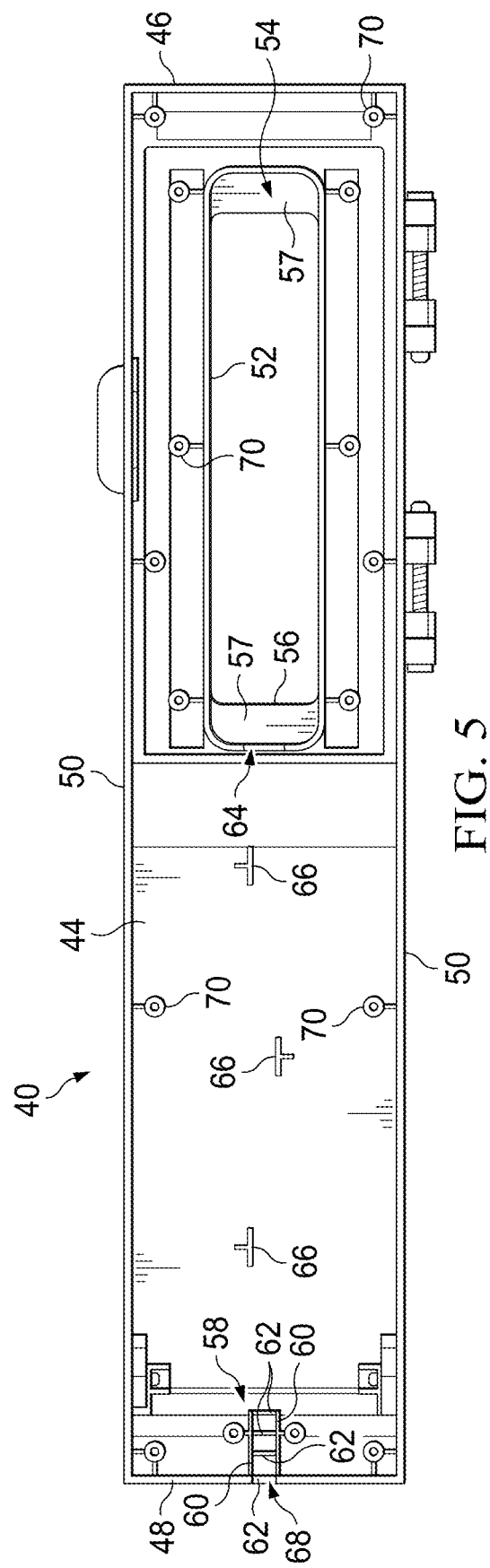
FIG. 5 is a lower plan view of the front enclosure of FIG. 4.

Referring now to FIGS. 4 and 5, the front enclosure 40 can include a front wall 44, an upper sidewall 46 at the upper end 16, a lower sidewall 48 at the lower end 18, and a pair of lateral sidewalls 50 that each extend between the upper and lower sidewalls 46, 48. The upper sidewall 46, the lower sidewall 48, and the lateral sidewalls 50 can extend from the front wall 44. An interior wall 52 can extend from the front wall 44 and can be spaced from the upper sidewall 46, the lower sidewall 48, and the lateral sidewalls 50. The interior wall 52 can at least partially define an interior receptacle 54 that is configured to receive the body 22 of the power strip 20. The front wall 44 can define a front aperture 56 and can include a pair of shoulders 57 that extend between the interior wall 52 and the front aperture 56. The interior wall 52 can be disposed adjacent to the front aperture 56 such that the interior receptacle 54 and the front aperture 56 are in communication with each other. When the body 22 of the power strip 20 is disposed in the interior receptacle 54, the body 22 can interface with (i.e., rest against) the shoulders 57, and the electrical sockets 28 and the switch 30 can be disposed adjacent to the front aperture 56 such that they are accessible to a user through the front aperture 56. When the cover 32 is in the closed position, the cover 32 can overlie the front aperture 56 and the body 22 of the power strip 20.

The front enclosure 40 can include a first cord support 58 disposed adjacent to the lower sidewall 48 (e.g., at the lower end 18) and configured to at least partially surround the cord 24 of the power strip 20. The first cord support 58 can include a pair of support walls 60 that are spaced from each other and that extend from each of the front wall 44 and the lower sidewall 48. A plurality of rib members 62 can extend between the support walls 60 and can be substantially convex-shaped. The lower sidewall 48 can define a notch 68 that is disposed adjacent to the first cord support 58.

The front enclosure 40 can include a plurality of cord guides 66 that extend from the front wall 44 and that are disposed between the interior wall 52 and the first cord support 58. The interior wall 52 can define a notch 64 that faces the first cord support 58. When the body 22 of the power strip 20 is disposed in the interior receptacle 54, the cord 24 can extend through the notch 64, along the cord guides 66, along the first cord support 58, and through the notch 68, such that the cord 24 extends from the housing 14 and is accessible external to the housing 14. The front enclosure 40 can also include a plurality of posts 70 that are configured to receive fasteners (not shown) for securing the front enclosure 40 and the rear enclosure 42 together.

Figure 6:
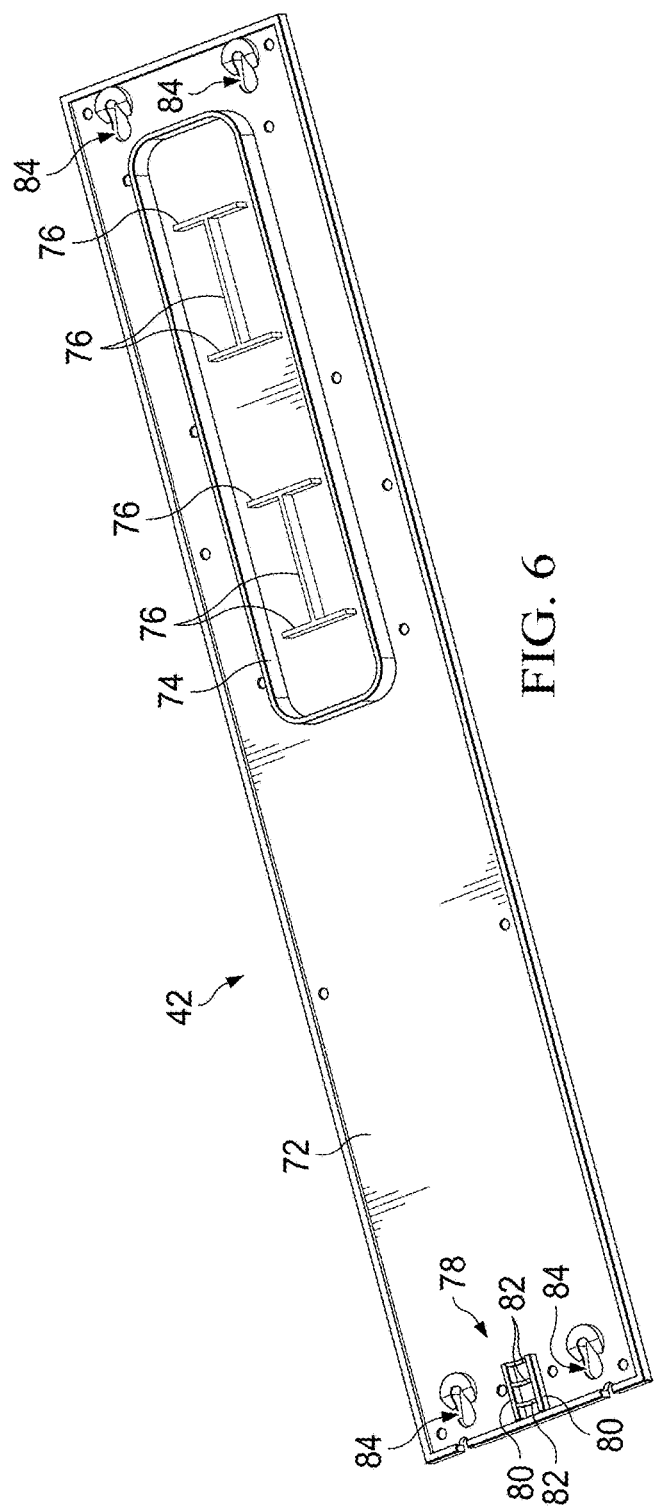
FIG. 6 is a front isometric view depicting a rear enclosure of the power delivery assembly of FIG. 1.

Referring now to FIG. 6, the rear enclosure 42 can include a rear wall 72 and an interior lip 74 that extends from the rear wall 72. The interior lip 74 can be positioned on the rear wall 72 to interface with the interior wall 52 of the front enclosure 40 (e.g., in an interference fit) when the front enclosure 40 and the rear enclosure 42 are coupled together. The interior lip 74 can have a slightly larger perimeter than the interior wall 52 such that the interior lip 74 fits over the interior wall 52. A plurality of rib members 76 can extend from the rear wall 72 and can be disposed within the interior lip 74 (e.g., such that the interior lip 74 surrounds the rib members 76 and the rib members 76 face the interior receptacle 54). In one embodiment, as illustrated in FIG. 6, the plurality of rib members 76 can be arranged in 2 different H-shaped configurations.

Figure 7:
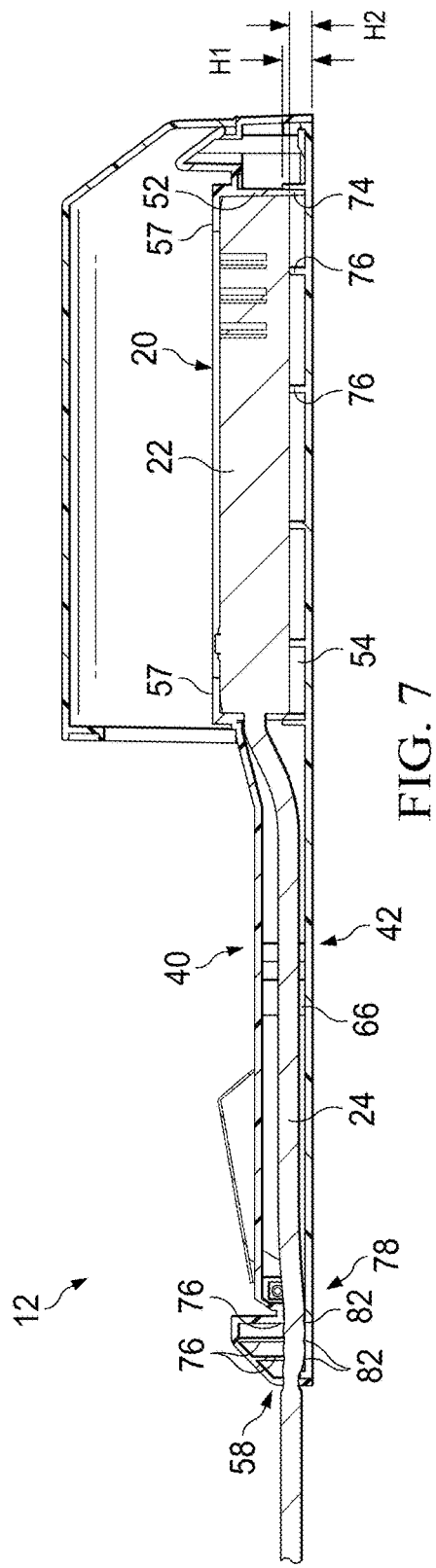
FIG. 7 is a cross-sectional view taken along the line 7-7 in FIG. 2 but with the shelf shown in a stored position and with certain components removed for clarity of illustration.

Referring now to FIG. 7, the interior lip 74 can have a height H1 and the rib members 76 can have a height H2 that is shorter than the height H1. When the body 22 of the power strip 20 is disposed in the interior receptacle 54 and the rear enclosure 42 is attached to the front enclosure 40, the interior lip 74 can fit over the interior wall 52 such that the interior wall 52 and the rear enclosure 42 can cooperate to effectively enclose the body 22 within the interior receptacle 54. The plurality of rib members 76 can be configured to engage the body 22 of the power strip 20 to facilitate urging of the body 22 into contact with the shoulders 57 and to facilitate retention of the body 22 within the interior receptacle 54 (e.g., to prevent the body 22 from moving inside of the interior receptacle 54). In one embodiment, the interior wall 52 can additionally or alternatively include retention features (not shown), such as ribs or clips, that interact with the body 22 to facilitate retention of the body 22 to the interior wall 52.

Referring again to FIGS. 6 and 7, the rear enclosure 42 can include a second cord support 78 that is configured to at least partially surround the cord 24 of the power strip 20. The second cord support 78 can include a pair of support walls 80 that are spaced from each other and that extend from the rear wall 72. A plurality of rib members 82 can extend between the support walls 80 and can be substantially convex-shaped. When the body 22 of the power strip 20 is disposed in the interior receptacle 54 and the rear enclosure 42 is attached to the front enclosure 40, as illustrated in FIG. 7, the cord 24 can be routed between the cord guides 66 (one shown in FIG. 7) and through the first cord support 58 and the second cord support 78. The cord guides 66 can cooperate with the rear enclosure 42 to facilitate routing and positioning of the cord 24 between the interior receptacle 54 and the first and second cord supports 58, 78.

The cord 24 can be sandwiched between the first and second cord supports 58, 78 to facilitate retention of the cord 24 therebetween. In particular, the cord 24 can be compressed between the rib members 62, 82 with enough force to prevent the cord 24 from sliding relative to the first and second cord supports 58, 78. The first and second cord supports 58, 78 can therefore cooperate to relieve the strain on the cord 24 that otherwise might be imparted to the portion of the cord 24 that is routed between the interior receptacle 54 and the first and second cord supports 58, 78 (along the cord guides 66).

It is to be appreciated that the power strip 20 can be an "off the shelf" type power strip that is readily available to consumers. As such, if the power strip 20 fails, it can be easily replaced with another power strip by removing the rear enclosure 42 from the front enclosure 40, removing the power strip 20, and installing a new power strip in its place. The front enclosure 40 and the rear enclosure 42, and more particularly, the interior wall 52, the first and second cord supports 58, 78, the cord guides 66, and the interior lip 74 can accordingly be configured to fit best with a specific style of "off the shelf" type power strips but can also accommodate other shapes and/or styles of "off the shelf" type power strips.

Referring again to FIG. 6, the rear enclosure 42 can define a plurality of openings 84 that facilitate securement of the power delivery assembly 12 to the vertical post 10 with fasteners (not shown). In one embodiment, the plurality of openings 84 can each be a keyhole shaped slot. To facilitate attachment of the power delivery assembly 12 to the vertical post 10, the fasteners can first be attached to the vertical post 10 at locations that substantially align with the openings 84. The power delivery assembly 12 can be hung on the vertical post 10 by aligning the openings 84 over the fasteners, pushing the power delivery assembly 12 flush against the vertical post 10 such that the fasteners extend into the openings 84, and sliding the power delivery assembly 12 downwardly to hold the power delivery assembly 12 in place. The power delivery assembly 12 can be removed by sliding the power delivery assembly upwardly and away from the fasteners and the vertical post 10. The power delivery assembly 12 can therefore be selectively installed and removed based upon whether a user wishes to have electrical power available at the vertical post 10. It is to be appreciated that by securing the power delivery assembly 12 to the vertical post 10 using the plurality of openings 84, the power strip 20 can be indirectly attached to the vertical post 10 (via the housing 14).

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. An assembly for supporting an electrical body, the assembly comprising:
    a housing comprising:
        a front enclosure comprising:
            a front wall that defines a front aperture; and
            an interior wall extending from the front wall and defining an interior receptacle that is configured to receive an electrical body that includes at least one electrical socket; and
            a sidewall that extends from the front wall and is spaced from the interior wall; and
        a rear enclosure coupled with the sidewall and extending therebetween such that the rear enclosure overlies the interior wall, wherein:
            the interior wall of the front enclosure is disposed adjacent to the front aperture such that the interior receptacle and the front aperture are in communication with each other;
            the interior wall defines a first notch; and
            the sidewall defines a second notch that is disposed adjacent to the first notch and cooperates with the first notch to at least partially support a cord of the electrical body.

2. The assembly of claim 1, wherein the sidewall comprises a lower sidewall and the front enclosure further comprises:
    an upper sidewall that extends from the front wall and is spaced from the lower sidewall; and
    a pair of lateral sidewalls that extend from the front wall, each lateral sidewall being spaced from each other and extending between the upper sidewall and the lower sidewall, and wherein the interior wall is spaced from the upper sidewall, the lower sidewall, and the pair of lateral sidewalls.

3. The assembly of claim 1, wherein the front wall further comprises a pair of shoulders, each shoulder of the pair of shoulders extending between the interior wall and the front aperture.

4. The assembly of claim 1, wherein the rear enclosure is releasably attached to the sidewall.

5. The assembly of claim 1, wherein the rear enclosure further comprises a cord support adjacent the second notch that is configured to at least partially surround the cord.

6. The assembly of claim 1 further comprising a cover pivotally coupled to the housing such that the cover is pivotable between an opened position and a closed position, wherein the cover overlies the front aperture when in the closed position.

7. The assembly of claim 1 further comprising a shelf disposed at a lower end of the housing.

8. A power delivery assembly comprising:
    an electrical body and a cord, the electrical body comprising at least one electrical socket; and
    a housing comprising:
        a front enclosure comprising:
            a front wall that defines a front aperture;
            an interior wall extending from the front wall, the interior wall defining an interior receptacle, wherein the electrical body is at least partially disposed in the interior receptacle such that the at least one electrical socket is disposed adjacent to the front aperture and is accessible through the front aperture; and
            a sidewall that extends from the front wall and is spaced from the interior wall; and
        a rear enclosure coupled with the sidewall and extending therebetween such that the rear enclosure overlies the interior wall and the electrical body, wherein:
            the interior wall of the front enclosure is disposed adjacent to the front aperture such that the interior receptacle and the front aperture are in communication with each other;
            the interior wall defines a first notch;
            the sidewall defines a second notch that is disposed adjacent to the first notch; and
            the cord extends through the first notch and the second notch to facilitate support of the cord with respect to the housing.

9. The power delivery assembly of claim 8, wherein the sidewall comprises a lower sidewall and the front enclosure further comprises:
    an upper sidewall that extends from the front wall and is spaced from the lower sidewall; and
    a pair of lateral sidewalls that extend from the front wall, each lateral sidewall being spaced from each other and extending between the upper sidewall and the lower sidewall, and wherein the interior wall is spaced from the upper sidewall, the lower sidewall, and the pair of lateral sidewalls.

10. The power delivery assembly of claim 8, wherein:
    the front wall further comprises a pair of shoulders;
    each shoulder of the pair of shoulders extends between the interior wall and the front aperture; and
    the electrical body interfaces with each shoulder of the pair of shoulders.

11. The power delivery assembly of claim 10, wherein the rear enclosure is releasably attached to the sidewall.

12. The power delivery assembly of claim 10, wherein the rear enclosure further comprises a cord support adjacent the second notch that is configured to at least partially surround the cord.

13. The power delivery assembly of claim 8 further comprising a cover pivotally coupled to the housing such that the cover is pivotable between an opened position and a closed position, wherein the cover overlies the front aperture when in the closed position.

14. The power delivery assembly of claim 8 further comprising a shelf disposed at a lower end of the housing.

15. A power delivery assembly comprising:
   an electrical body and a cord, the electrical body comprising at least one electrical socket; and
   a housing comprising:
      a front enclosure comprising:
         a front wall that defines a front aperture; and
         an interior wall extending from the front wall, the interior wall defining an interior receptacle, wherein the electrical body is at least partially disposed in the interior receptacle such that the at least one electrical socket is disposed adjacent to the front aperture and is accessible through the front aperture; and
      a rear enclosure coupled with the front enclosure and extending thereto such that at least a portion of the rear enclosure overlies the interior wall and the electrical body, the rear enclosure comprising a cord support, wherein:
         the interior wall of the front enclosure is disposed adjacent to the front aperture such that the interior receptacle and the front aperture are in communication with each other;
         the interior wall defines a first notch; and
         the cord support is proximate the first notch and cooperates with the first notch to support the cord with respect to the housing.

16. The power delivery assembly of claim 15, wherein the front wall further comprises a pair of shoulders, each shoulder of the pair of shoulders extending between the interior wall and the front aperture.

17. The power delivery assembly of claim 15, wherein the rear enclosure is releasably attached to the sidewall.

18. The power delivery assembly of claim 15, wherein the cord support comprises a convex-shaped rib member that is configured to at least partially surround the cord.

19. The power delivery assembly of claim 15 further comprising a cover pivotally coupled to the housing such that the cover is pivotable between an opened position and a closed position, wherein the cover overlies the front aperture when in the closed position.

20. The power delivery assembly of claim 15 further comprising a shelf disposed at a lower end of the housing.

* * * * *